(12) United States Patent
Hubeli et al.

(10) Patent No.: US 6,760,023 B2
(45) Date of Patent: Jul. 6, 2004

(54) SYSTEM AND METHOD FOR CORRECTLY DECIMATING HEIGHT FIELDS WITH MISSING VALUES

(75) Inventors: Andreas G. P. Hubeli, Maroggia (CH); Richard P. Hammersley, Austin, TX (US)

(73) Assignee: Schlumberger Technology Corporation

( * ) Notice: Subject to any disclaimer, the term of this patent is extended or adjusted under 35 U.S.C. 154(b) by 306 days.

(21) Appl. No.: 10/104,089

(22) Filed: Mar. 22, 2002

(65) Prior Publication Data

US 2003/0034970 A1 Feb. 20, 2003

Related U.S. Application Data

(60) Provisional application No. 60/279,904, filed on Mar. 29, 2001.

(51) Int. Cl.[7] ............................................. G06T 15/00
(52) U.S. Cl. ...................................................... 345/420
(58) Field of Search ................................ 345/418, 419, 345/420, 423, 427, 619

(56) References Cited

U.S. PATENT DOCUMENTS

| 5,590,248 A | | 12/1996 | Zarge et al. ................ 395/121 |
| 5,847,711 A | * | 12/1998 | Kaufman et al. ........... 345/424 |
| 5,929,860 A | | 7/1999 | Hoppe ......................... 345/419 |

OTHER PUBLICATIONS

Devillers, O., "On deletion in dulanay triangulation," *Technical Report RR–3451*, Inria, Institut National de Recherche en Informatique et en Automatique, 1999.
Dey, T. et al., "Topology preserving edge contraction," *Technical Report*, Raindrop Geomagic Inc., Research Triangle Park, North Carolina, 1998.
Gross, M. H. et al., "Efficient Triangular Surface Approximations using Wavelets and Quadtree Data Structures," *IEEE Transactions on Visualization and Computer Graphics*, 2(2):130–143, Jun. 1996.
Hammersley, R. et al., "Decremental Delaunay Triangulation." In ACM, editor, *SIGGRAPH 99, Proceedings of the 1999 SIGGRAPH annual conference: Conference abstracts and applications*, Computer Graphics, pp. 238–238, New York, NY 10036, USA, 1999. ACM Press.
Hoppe, H., "Progressive Meshes." In H. Rushmeier, editor, *SIGGRAPH 96 Conference Proceedings*, Annual Conference Series, pp. 99–108. ACM SIGGRAPH, Addison Wesley, Aug. 1996. Held in New Orleans, Louisana, Aug. 4–9, 1996.
Midtbo, T., "Removing points from a delaunay triangulation." In *Sixth International Symposium on Spatial Data Handling*, vol. 2, pp. 739–750, Edinburgh, Scotland, 1994.
Pajarola, R., "Large Scale Terrain Visualization using the Restricted Quadtree Triangulation." In *Proceedings IEEE Visualization '98*, pp. 19–26. IEEE, 1998.
Schröder, W. J. et al., "Decimation of Triangle Meshes." In E. E. Catmull, editor, *Computer Graphics (SIGGRAPH '92 Proceedings)*, vol. 26, pp. 65–70, Jul. 1992.

(List continued on next page.)

Primary Examiner—Phu K. Nguyen
(74) Attorney, Agent, or Firm—Schlumberger Technology Corporation

(57) ABSTRACT

Simplifying a surface represented as a height field. The simplification resulting in a triangular mesh having n vertices, such that the topology of the surface is maintained in the simplified surface representation. The simplification including assigning error values to each vertex not having a missing value, identifying as required vertices those vertices that may not be removed without altering the topology of the surface; and (1) if n is less than or equal the number of required vertices, remove all other vertices or (2) if n is greater than or equal the number of required vertices, remove u-n vertices, where u is the number of vertices that do not have missing values in the original height field.

26 Claims, 11 Drawing Sheets

OTHER PUBLICATIONS

Shewchuk, J. R., "Triangle: Engineering a 2D Quality Mesh Generator and Delaunay Triangulator." In M. C. Lin and D. Manocha, editors, *Applied Computational Geometry: Towards Geometric Engineering*, vol. 1148 of *Lecture Notes in Computer Science*, pp. 203–222. Springer–Verlag, May 1996. From the First ACM Workshop on Applied Computational Geometry.

Staadt, O. G. et al., "Progressive Tetrahedralizations." In *Proceedings of IEEE Visualization '98*, pp. 397–402. IEEE, 1998.

Bajaj, C.L. et al., "Topology Preserving Data Simplification with Error Bounds", Computers and Graphics, Pergamon Press Ltd., Odford, GB, vol. 22, No. 1, Feb. 25, 1998, pp. 3–12.

Bajaj, C. L. et al., "Progressive Compression and Transmission of Arbitrary Triangular Meshes", Proceedings Visualization '99, VIS '99, San Francisco, CA, Oct. 24–29, 1999, Annual IEEE Conference on Visualization, Los Almitos, CA: IEEE Comp. Soc, US, Oct. 24, 1999, pp. 307–316.

Riegel, T. et al, "Shape–Initialisation of 3–D Objects in Videoconference Scenes", Proceedings of the SPIE, SPIE, Bellingham, VA, US, vol. 3012, Feb. 11, 1997, pp. 116–124.

Sheng, X. et al., "Generating Topological Structures for Surface Models", IEEE Computer Graphics and Applications, IEEE Inc,., New York, US, vol. 15, No. 6, Nov. 1995, pp. 35–41.

* cited by examiner

SYSTEM AND METHOD FOR CORRECTLY DECIMATING HEIGHT FIELDS WITH MISSING VALUES

RELATED APPLICATION

This application is a conversion of Provisional U.S. application Ser. No. 60/279,904 filed on Mar. 29, 2001 that was entitled "D3b: Decimation of Height Fields with Missing Values" by the same inventors as the present application.

TECHNICAL FIELD

This invention relates in general to the field of computer graphics and more particularly to the field of simplification of geometrical representations of objects.

BACKGROUND OF THE INVENTION

Geometric models, usually represented by a collection of triangles, are becoming increasingly complex, as acquisition systems improve. The performance of interactive environments using or displaying the data can be improved by reducing the size of the data. This data size reduction is the objective of surface simplification techniques. Such techniques accept surfaces as input and return arbitrarily simplified surfaces as output.

One data modeling technique is modeling three-dimensional surfaces as height fields. In a height field a two-dimensional grid has a corresponding value in a third dimension, i.e., for each (x,y) coordinate there is a corresponding height, z. Height field data is an important geometric representation in many fields, such as geoscience.

One problem is how to simplify height field data which contains missing values, in particular, how to generate topologically correct continuous level of detail (LOD) approximations efficiently. A topologically correct simplification is one that does not have self-intersections of boundaries in parameter space in any approximation and also preserves the genus of the surface. A configuration demonstrating a self-intersecting simplification is shown in FIG. 2. The standard simplification operators presented in the literature cannot handle the self-intersection problem well, and consequently they cannot guarantee intersection-free approximation in image space. This problem has previously been attacked using two different strategies:

I. Explicitly checking whether a simplification operation introduces self-intersections (O. G. Staadt and M. H. Gross, "Progressive tetrahedralizations," *Proceedings IEEE Visualization '98*, pp. 397–402, IEEE, 1998.). However, these check operations are global in nature, and although they can be accelerated, slow the simplification algorithms down.

II. Detecting self-intersections using local operations by triangulating the holes present in the surface. Depending on the simplification operator used, a self-intersection can be detected by analyzing the neighbor triangles defined over the hole. For example, if the vertex $x_{ij}$ of FIG. 2a was to be removed using an edge collapse operation (described in greater detail below and in H. Hoppe, "Progressive meshes," In H. Rushmeier, editor, *SIGGRAPH 96 Conference Proceedings*, Annual Conference Series, pages 99–108, ACM SIGGRAPH, Addison Wesley, August 1996.) onto the vertex $x_{k,l}$, the self-inter-section that would be introduced could be detected by noting that the gray triangle 201 flipped as illustrated by the triangles 201' and 201" of FIG. 2b during the operation.

Surface simplification is an important core technology in many applications, and as a consequence many different research groups have focused on creating flexible and efficient frameworks to handle large data sets. One approach is introduced in W. J. Schröder, J. A. Zarge, and W. E. Lorensen. "Decimation of triangle meshes." In E. E. Catmull, editor, *ComputerGraphics (SIGGRAPH '92 Proceedings)*, volume 26, pages 65–70, July 1992 and further described in U.S. Pat. No. 5,590,248, to Jonathan A. Zarge and William J. Schroeder, "Method for Reducing the Complexity of a Polygonal Mesh, filed Feb. 24, 1995, continuation of Ser. No. 815,772, Jan. 2, 1992, abandoned. In that article, the authors introduced the fundamental vertex removal operator. Using this operator, surfaces are simplified by removing one vertex at a time, and then re-triangulating the hole introduced by removal operation. This operator, in conjunction with a divide and conquer triangulation strategy, is powerful enough to handle complex surfaces, such as general two-manifolds. The operator was subsequently used as one approach to construct multiresolution representations of height field data.

The second fundamental operator of edge collapse was introduced in H. Hoppe. "Progressive meshes." In H. Rushmeier, editor, *SIGGRAPH 96 Conference Proceedings*, Annual Conference Series, pages 99–108. ACM SIGGRAPH, Addison Wesley, August 1996, held in New Orleans, La., Aug. 04–09, 1996. This technique is also described in U.S. Pat. No. 5,929,860 to Hoppe; Hugues H., entitled "Mesh simplification and construction of progressive meshes," filed Feb. 7, 1997, continuation of Ser. No. 08/586,953, filed Jan. 11, 1996.

The edge-collapse operator simplifies meshes by collapsing the pair of vertices joined by an edge. The advantage of this approach is that there is no need to re-triangulate holes as in the case of vertex removal algorithms. On the downside, meshes generated by this approach might have poor characteristics, unless the set of allowable edge collapses are chosen carefully.

While the previous operators are generally applicable to two-manifold surfaces, much effort has been spent in constructing representations for height field data stored in regular grids. In M. H. Gross, O. G. Staadt, and R. Gatti. "Efficient Triangular Surface Approximations Using Wavelets and Quadtree Data Structures." *IEEE Transactions on Visualization and Computer Graphics*, 2(2):130–143, June 1996, the authors used a wavelets representation of height fields coupled with a look-up table to construct multi-resolution approximations of data defined on a regular domain. In R. Pajarola. "Large scale terrain visualization using the restricted quadtree triangulation." *In Proceedings IEEE Visualization'98*, pages 19–26. IEEE, 1998, a quadtree was used to store the data. By restricting the choice of the vertices present in any approximation, Pajarola could define a look-up table that not only could triangulate the chosen vertices, but could also generate a single triangle strip. Both of these approaches have the advantage of being fast, since they are optimized for height field data, but they have the disadvantage that they work best with grids whose size is a power of two. If this is not the case, then it is necessary to extend the basic algorithms to handle many different special cases. For the same reason, it would be extremely difficult to let these structures handle height fields with missing values.

All of the representations discussed in this section are capable of guaranteeing that a simplification operation will not change the topology of the surface locally. However, none of them is capable of guaranteeing that a simplification operation will not introduce a self-intersection. With avoidance of self-intersection as a requirement, one of the two approaches described above would need to be implemented.

For these reasons there is an unmet need for an efficient surface simplification method that accepts a height field as input and that produces a topologically correct surface simplification.

DETAILED DESCRIPTION OF THE PREFERRED EMBODIMENTS

Simplification of height fields is an important step in displaying large data sets in interactive environments. Simplification makes interaction with large data sets practical. In many domains, for example, geoscience, the data may be incomplete, i.e., have areas of missing values. In geoscience, a geological layer may be intersected by other geological formations. For example, a boundary between two geological zones may be intersected by a salt dome. In the area occupied by the salt dome, the boundary surface between the two zones may not contain any values and be depicted as holes in the surface. To render an accurate but simplified view of such surfaces, it is important to accurately maintain the topology of the surface, including the areas of missing values, in simplifications of the surface.

Figure 1A:
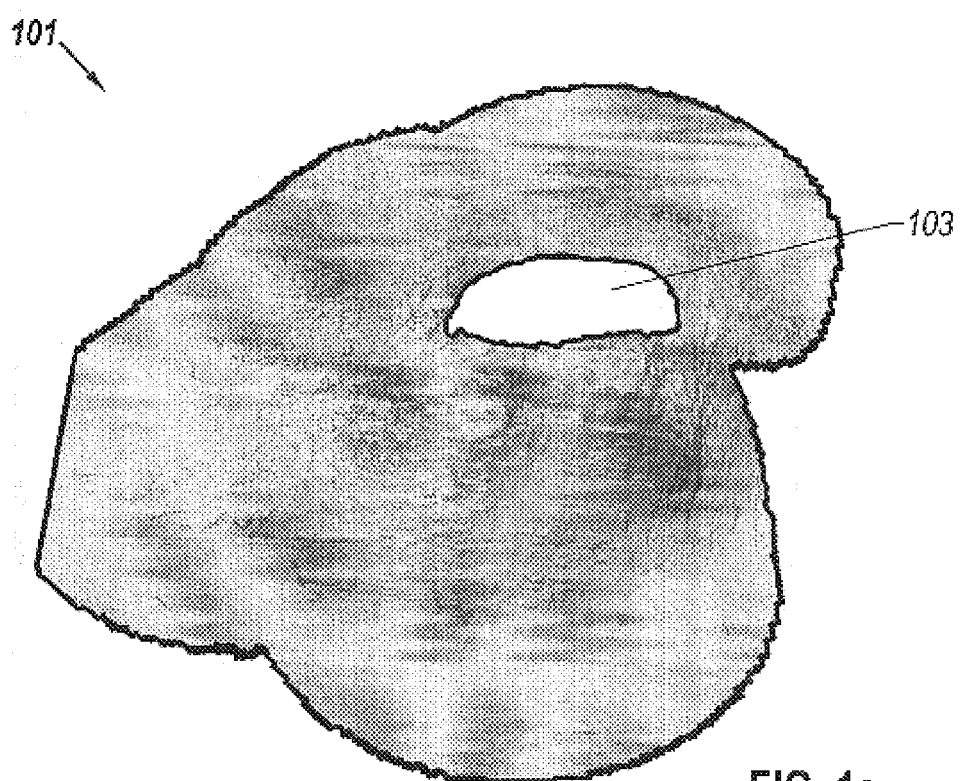
FIGS. 1a–1c illustrate representations at several different levels of simplification of a geological layer having missing value regions.
Figure 1B:
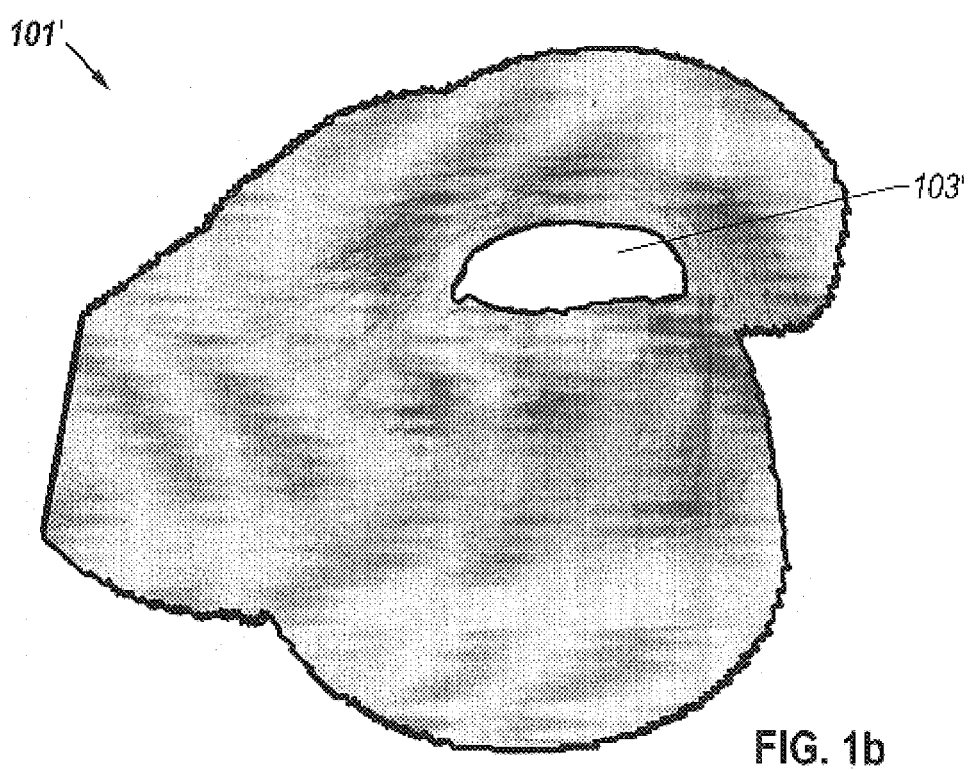

FIG. 1 is an illustration of a representation at several different levels of simplification of a geological layer having a missing value region. FIG. 1a shows an input surface 101 represented as a height field on a regular grid at full-resolution. The surface 101 has an area of missing values 103. FIG. 1b shows the same surface simplified to a somewhat coarser resolution with the surface topology preserved.

Figure 1C:
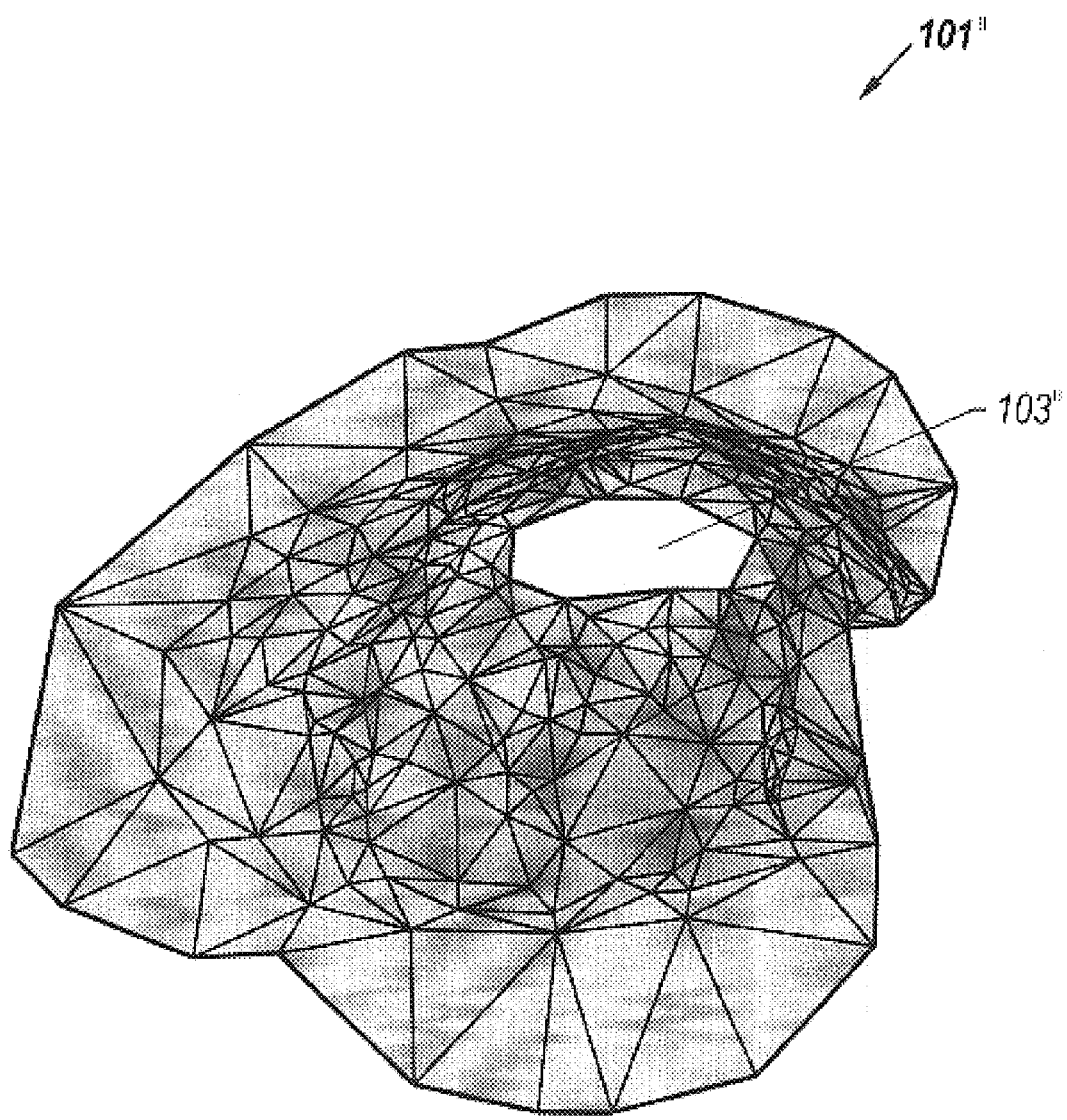
Figure 2A:
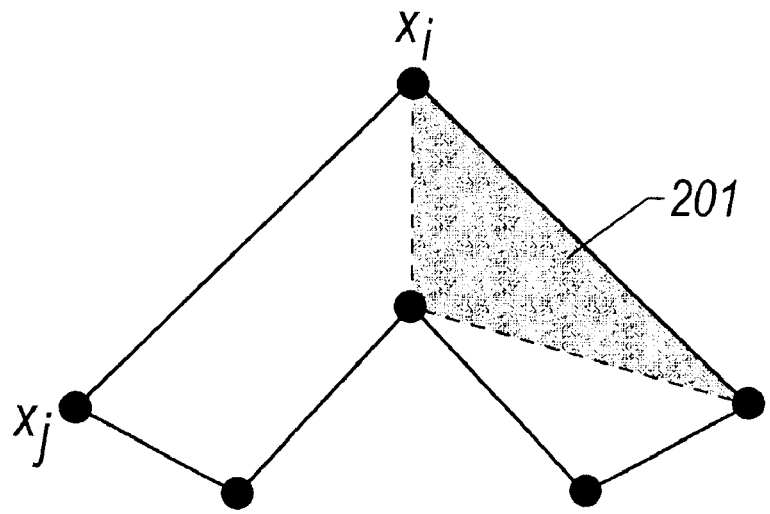
FIGS. 2a–2b are graphical illustrations in parameter space depicting a boundary self-intersection problem caused by an edge collapse operation.
Figure 2B:
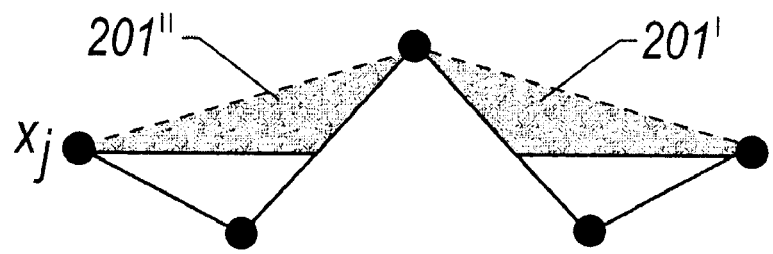

FIG. 1c is a further simplification of the surface 101 into a representation 101' having much fewer vertices and with the triangulation exposed. Note that the representations of the surface 101' and 101" in FIGS. 1b and 1c, respectively, maintain the topology of the surface, for example, as illustrated by the areas of missing values 103' and 103" in FIGS. 1b and 1c, respectively.

Figure 3:
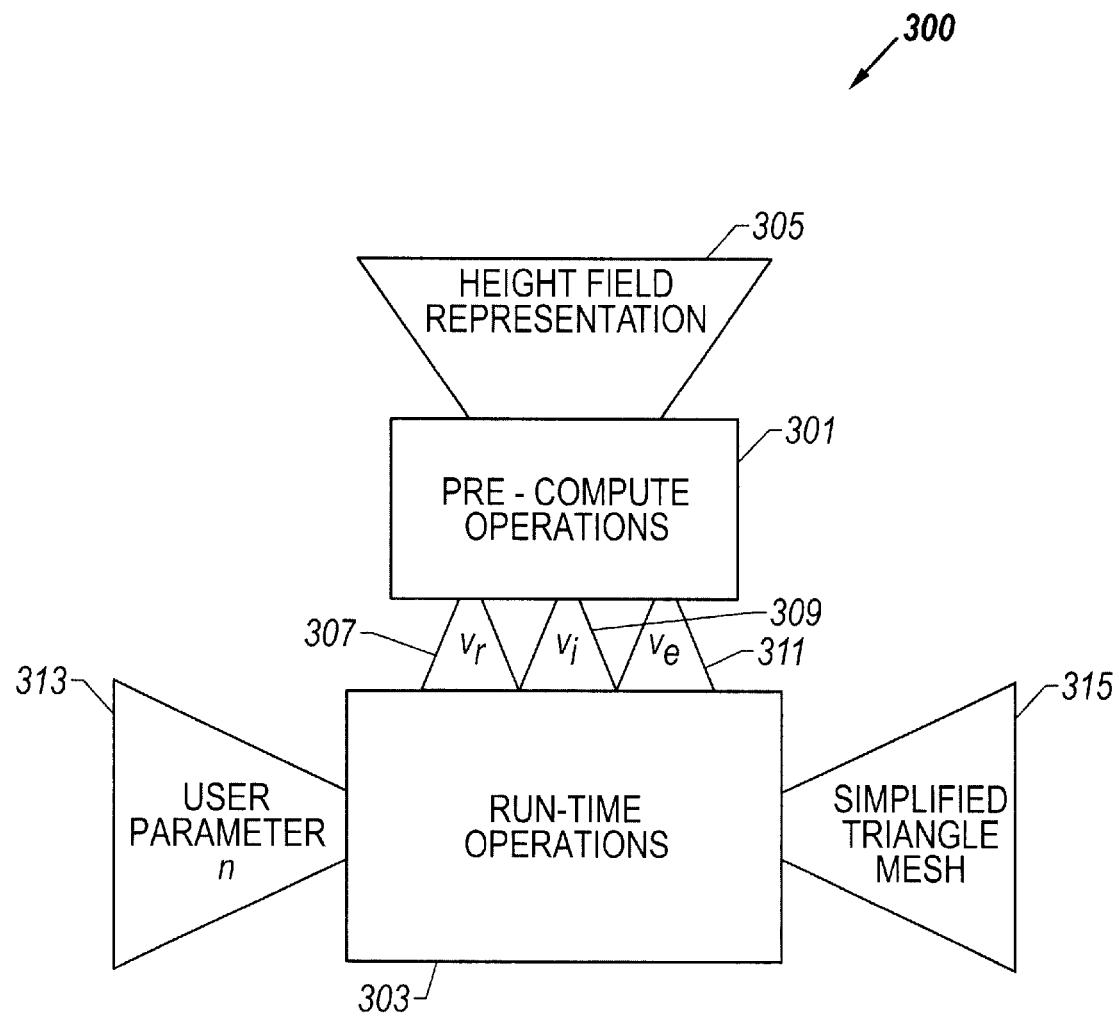
FIG. 3 is a high-level schematic illustrating data flow between two major components of one embodiment of a height field decimator according to the invention.

FIG. 3 is a high-level schematic illustrating data flow between two major components of one embodiment of a height field decimator 300 according to the invention. The first major component of a height field decimator 300 according to this embodiment of the invention is the pre-compute operations 301 and the second is the run-time operations 303.

In the pre-compute operations 301 the input data is analyzed, and an importance value is assigned to every vertex in the mesh. These values depend on the underlying error norm, but also on the requirement that we only allow topologically consistent approximations. Furthermore, we compute the information in such a way as to minimize the computations incurred in the run-time component of the algorithm. Detailed information on this first step is provided below.

The height field representation of a surface to be simplified is input 305 into the pre-compute operations 301. The pre-compute operations 301 operates on the input height field structure hF, which comprises the following information:

The two-dimensional grid X of scalar values $x_{i,j}$ of size $S_u \times S_v$.

The origin $o=[o_x, o_y, o_z]^T$ of the grid, which describes the location of the first vertex in the parameter domain.

The parameter axes u, v, which define the parameter domain of the grid.

A scalar value $x_m$ that represents a missing value. If $x_{i,j}=x_m$ then no data is defined for the grid point i,j.

This information fully describes the parameter and spatial position of the i,j vertex, which are computed as:

The parameter position only depends on the two indices i,j and not on the axes u, v or the grid X. The natural parameterization of the vertex is then defined as $$P(x_{i,j})=p_{i,j}=(i,j) \tag{1}$$

Figure 10:
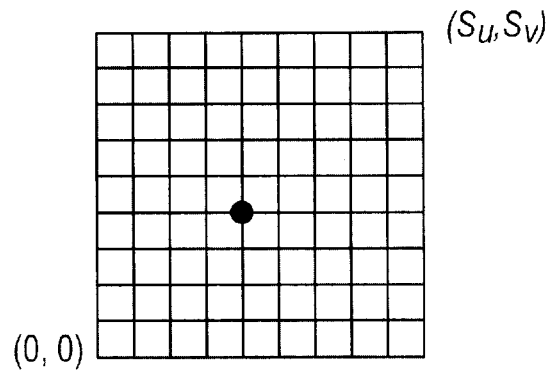
FIG. 10 is a regular grid.

Thus, the position of the grid point i,j on the parameter domain is defined by a two-dimensional vector. The parameterization according to an embodiment of the invention is described in greater detail below in conjunction with FIGS. 10, 11, and 12.

The position of the grid point i,j in three-dimensional space is computed as $$x = o + u \cdot \frac{i}{s_x - 1} + v \cdot \frac{j}{s_y - 1} + n \cdot x_{i,j} \tag{2}$$

with $$n = \frac{u \times v}{\|u \times v\|} \tag{3}$$

This implies that its position is defined as a point on the parameter domain plus an offset of magnitude $x_{i,j}$ along the normal of the parameter plane.

The pre-compute operations produce three output vectors, $v_r$ 307, $v_i$ 309, and $v_e$ 311.

The vector $v_r$ 307 stores the set of vertices that must be present in any approximation to assure that the approximation preserves the topology of the input surface 305. These vertices are required to guarantee the construction of topologically correct approximations of the input surface 305.

The vector $v_i$ 309 stores the remaining vertices sorted by their importance, starting from the most important.

The vector $v_e$ 311 stores the error associated with every element in the height field representation 305. Therefore, the error of the $j^{th}$ vertex in $v_i$ corresponds to the $j^{th}$ entry in $v_e$.

In the run-time operations 303, the information, i.e., $v_r$ 307, $v_i$ 309, and $v_e$ 311, computed in the pre-compute operations 301 is used to compute efficiently topologically correct approximations 315 of the input data according to a user defined parameter 313. In one embodiment of the invention, many computations are located in the pre-compute operations 301 to minimize the computations required in run-time operations 305, in order to accelerate the computation of approximations. The run-time operations 305 are described in greater detail below.

Pre-Compute Operations 301

Figure 4:
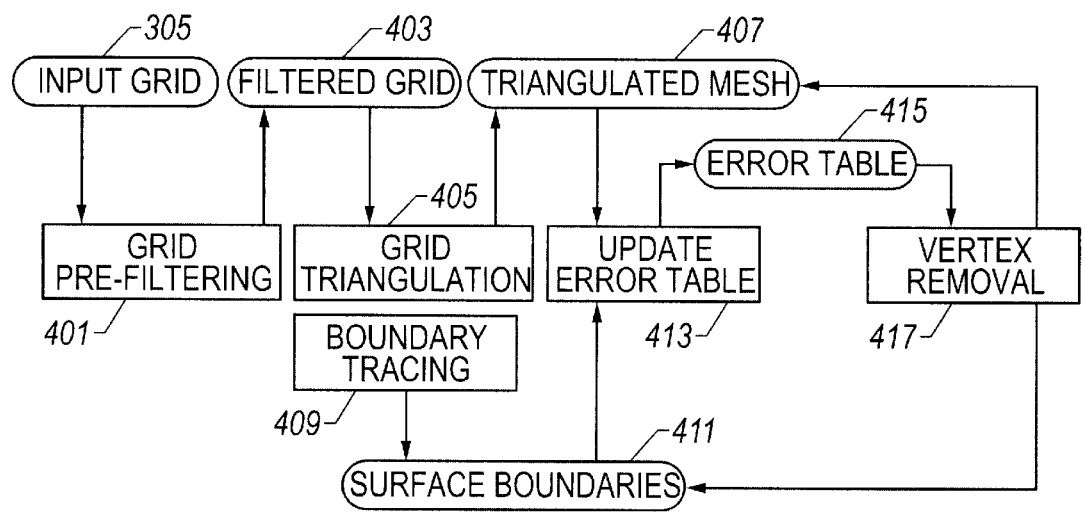
FIG. 4 is a data-flow diagram of the pre-compute operations of the height field decimator of FIG. 3.

FIG. 4 is a data-flow diagram of the pre-compute operations 301. The following pseudo-code describes at a high level the pre-compute operations 301; each step is described in greater detail below.

```
void Precompute (heightfield hF) {
    // Step 1: Filter the grid
    prefilterGrid (hF);
    // Step 2: Trace its boundaries
    bnd = traceBoundaries (hF);
    // Step 3: Triangulate the grid
    nbr = trangulateSurface (hF);
    // Step 4: Compute the vertex error
    for all vertices x in the surface do
        updateErrorTable (x, nbr, bnd, eTable);
    // Step 5: Construct the importance array
    while eTable is not empty and minError != ∞ do {
        // Step 6: Fetch the vertex with smallest error
        x = popVertex (eTable);
        // Step 7: Remove vertex with smallest error
        removeVertex (x, nbr, bnd);
        // Step 8: Update error of neighbor vertices
        for all neighboring vertices xN of x do
            updateErrorTable (xN, nbr, bnd, eTable);
    }
}
```

The input height field, hF, 305 is input to a Grid Pre-Filtering operation, which outputs a filtered grid 403. The first step in any subsampling operation consists in low-pass filtering the input data. Since the input data is available as regular grid, the filter operation for a vertex is computed efficiently using a standard discretization of the Laplacian as $$x_{i,j}'=x_{i,j}+\lambda \cdot \Delta x_{i,j} \quad (4)$$

The term $\Delta x_{i,j}$ corresponds to the discrete second order divided difference operator defined as $$\Delta x_{i,j} = \frac{1}{2}\left(\frac{1}{2}x_{i-1,j} - x_{i,j} + \frac{1}{2}x_{i+1,j}\right) + \frac{1}{2}\left(\frac{1}{2}x_{i,j-1} - x_{i,j} + \frac{1}{2}x_{i,j+1}\right) \quad (5)$$

This low-pass filtering technique, which can be interpreted as a diffusion process, can be applied multiple times, as required by the input data. Since the height field contains missing values, the neighbors of a point will not always be present. This problem is solved by filtering only along the parameter axes, where both neighbors of $x_{i,j}$ are present.

The formulation expressed in Equation 5 above is only correct if the four neighboring vertices of $x_{i,j}$ are well defined. If either $x_{i-1,j}$ or $x_{i+1,j}$ or both are missing, the first term in Equation 5 is ignored, and similarly if either of the remaining two neighbors is missing the second term is discarded. If both terms in Equation 5 are discarded, the position of $x_{i,j}$ is interpolated.

For example, FIG. 1b is a filtered and simplified version of the input surface shown in FIG. 1a.

Triangulating the Grid 405

The second operation consists of triangulating all the vertices in the filtered dataset that are not missing values, operation 405. In a preferred embodiment of the invention, the triangulation operation 405 is performed by computing the Delaunay triangulation of these points in parameter space. Formally, a Delaunay triangulation is defined as:

Definition: The Delaunay triangulation of a point set is a triangulation with the property that no point in the point set falls in the interior of the circumcircle of any triangle. The circumcircle of a triangle is defined as the (unique) circle that interpolates its three defining vertices.

In a preferred embodiment of the invention, an unconstrained Delaunay triangulation algorithm is used to compute the convex hull triangulation of these vertices. The term unconstrained implies that no edge in the output triangulation is fixed, but they are rather all computed utilizing the criteria stated in the definition of a Delaunay triangulation. The algorithm generates the complete triangulation of the convex hull of the vertices, i.e. both the surface and its holes are triangulated. The convex hull of a point set is defined as Definition: The convex hull of a set of points X in is the boundary of the smallest convex domain in ℜ containing X.

In a preferred embodiment, a Delaunay triangulation algorithm is used for several reasons: if a valid parameterization is available then the triangulation of any set of vertices extracted from the height field data is guaranteed to be unique. Furthermore, local operations such as the removal or the insertion of a vertex result in local changes to the triangulation, and thus it is possible to make use of incremental and decremental update algorithms. Also, a Delaunay triangulation algorithm returns the vertices of a triangle ordered in a consistent orientation, for example, in a counterclockwise direction. Finally, efficient and robust implementations of the Delaunay triangulation algorithm are readily available.

The output of the Grid Triangulation operation 405 is a Triangulated mesh 407. The triangulated mesh is further updated by the Vertex removal operation 417 described below.

Tracing the Surface Boundaries 411

The boundaries of the surface stored in the height field hF are not available explicitly, since they depend on the distribution of the missing values $x_r$ in the grid. The boundaries must be extracted explicitly, since boundary data is used by both the pre-compute operations 301 and, as is discussed in greater detail below, by the run-time operations 303. The boundary structure 411 provides basic functionalities, such as a function to test whether a vertex lies on a boundary of the surface. In addition, the boundary structure 411 numbers the vertices in each boundary according to the following strategy. The first vertex in the boundary is assigned the index 0 and the remaining vertices are assigned increasing indices by traversing the boundary counterclockwise with respect to the parameter domain. This approach guarantees that the surface lies on the left-hand side of the boundary and the missing values on the right-hand side. The boundary structure 411 is utilized throughout the pre-compute operations 301 to verify whether an approximation is topologically correct, and it is also a component used by the run-time operations 303 to accelerate the construction of topologically consistent approximations.

The tracing operation could be performed on the triangulation of the data computed in the previous step. However, doing so is a complex algorithm. Instead, it is more efficient to calculate the boundary information on the Delaunay triangulation of the entire grid, i.e. both the surface samples and the missing values are triangulated. The tracing algorithm is then initialized by finding a boundary vertex $x_{i,j}$ that does not belong to any boundary that has already been traced.

Definition: A vertex $x_{i,j}$ lies on the boundary of the surface if any of its neighbors $x_{k,l}$ is a missing value, i.e.

$$x_{k,l} = x_m$$

The neighborhood relationships are extracted from the triangulation of the full-resolution grid including vertices having missing values.

The boundary is then traced starting from $x_{i,j}$ by inspecting the neighbors of $x_{i,j}$, which are sorted in a counterclockwise order. The $k^{th}$ neighbor of $x_{i,j}$ is the next boundary element if one of the following conditions is met:

Condition 1: The $(k-1)^{st}$ and the $k^{th}$ neighbors of $x_{i,j}$ are not missing values and the $(k+1)^{st}$ neighbor is a missing value.

Condition 2: The $(k+1)^{st}$ and the $k^{th}$ neighbors of $x_{i,j}$ are not missing values and the $(k-1)^{st}$ neighbor is a missing value.

Both tests are performed modulo the number of neighbors of $x_{i,j}$. If the $k^{th}$ neighbor of $x_{i,j}$ satisfies Conditions 1 and 2, it is added to the boundary structure 411.

Figure 5A:
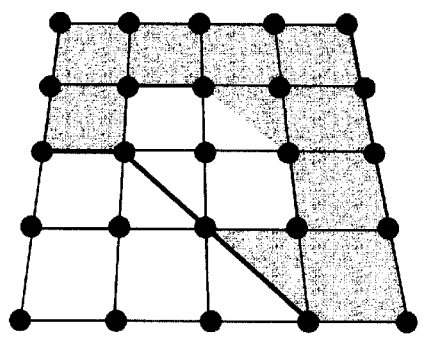
FIGS. 5a–5b are illustrations of a problem that may occur if boundary tracing is not done correctly.
Figure 5B:
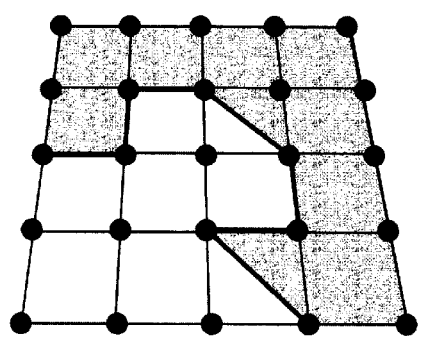

FIG. 5 is an illustration of a problem that may occur if boundary tracing is not done correctly. Some straightforward approaches to boundary tracing may generate potentially incorrect boundary information, as is illustrated in the example depicted in FIG. 5a. The approach according to a preferred embodiment and described herein above generates the correct result illustrated in FIG. 5b.

The data computed by the first two stages of the algorithm describes the input full-resolution surface. The importance and error vectors are then constructed by iteratively removing the least important vertex from the current approximation, while ensuring that the triangulation and boundary information remains up-to-date.

Update of the Error Table Operation 413

One of the principal components of the pre-compute pipeline is responsible for the creation and the maintenance of the error table 415. The error table 415 stores a scalar value for every vertex $x_{i,j}$ that represents the error that would be introduced by the removal of $x_{i,j}$. The error is computed from the current approximation of the surface and the approximation that would be obtained with the removal of $x_{i,j}$. The triangle mesh without the vertex $x_{i,j}$ is computed with the decremental Delaunay triangulation algorithm discussed in the subsection describing the vertex removal operation 417 herein below.

The update of the error table update operation 413 accepts as inputs the triangulated mesh 407, which is either obtained from the grid triangulation 405 or from the vertex removal operation 417. The error table update operation 413 also accepts the surface boundaries 411 from the boundary tracing operation 409 or as updated by the vertex removal operation 417.

The error associated with the removal of $x_{i,j}$ is computed by the error table update operation 413 according to $$E(x_{i,j}) = \begin{cases} E_c(x_{i,j}) & \text{if } R(x_{i,j}) = \text{true} \\ \infty & \text{otherwise} \end{cases} \quad (6)$$

where $R(x_{i,j})$ is a binary function that decides whether the removal of $x_{i,j}$ would result in a topologically consistent approximation, and $E_c(x_{i,j})$ is a user-defined function that measures the error introduced by the removal operation. The error function defined in Equation 6 separates the topological consistency check from the error computation in order to facilitate the construction of custom error norms $E_c(x_{i,j})$. As a consequence, a user of an implementation of the invention is not required to understand the intricacies underlying the invention.

The topological consistency test performed by the function $R(x_{i,j})$ ensures that the following condition is satisfied:

Condition 3: A vertex removal operation is admitted if and only if the vertices that represent every surface boundary after the collapse operation are a subset of the vertices in each of the full-resolution boundaries.

This implies that if a boundary vertex is being removed, then the number of vertices in its boundary must decrease by one as a result of the removal operation.

If Condition 3 is satisfied during the entire pre-compute pipeline, then every approximation of the input surface generated by the run-time pipeline is topologically consistent and it does not contain self-intersections in parameter space.

All vertices in the interior of the surface trivially fulfill Condition 3, since their removal does not affect the boundaries of the surface. Consider a boundary vertex $x_{i,j}$ and its two neighbors on the boundary. The removal of $x_{i,j}$ satisfies Condition 3 if and only if:

An edge connects the two neighbors $x_{k,l}$ and $x_{m,n}$ and after the removal of $x_{i,j}$.

If the edge connecting $x_{k,l}$ and $x_{m,n}$ was present before the removal operation, then the vertices $x_{i,j}$, $x_{k,l}$ and $x_{m,n}$ spanned a simplex in the surface.

Figure 6A:
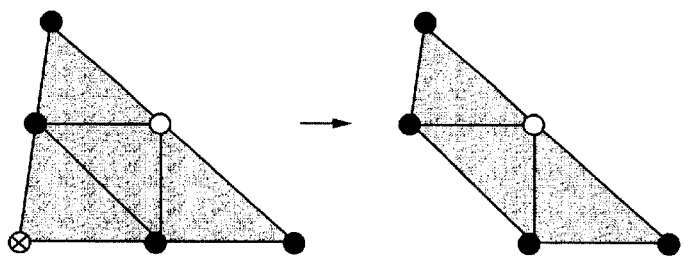
FIGS. 6a–6c are illustrations of valid and invalid vertex removal operations in the vicinity of a boundary.
Figure 6B:
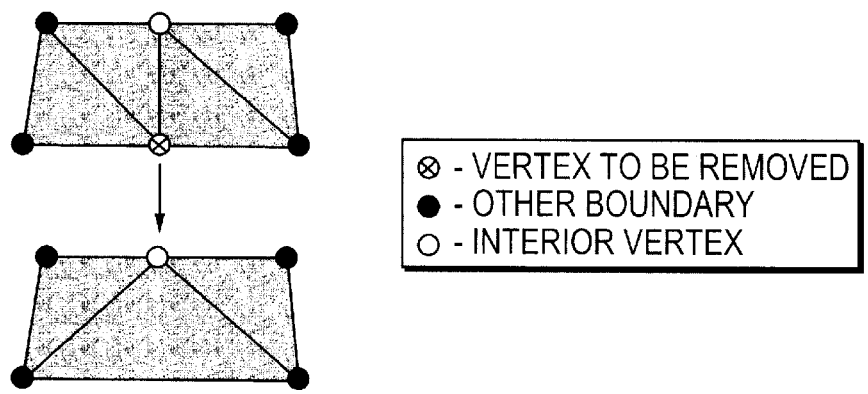
Figure 6C:
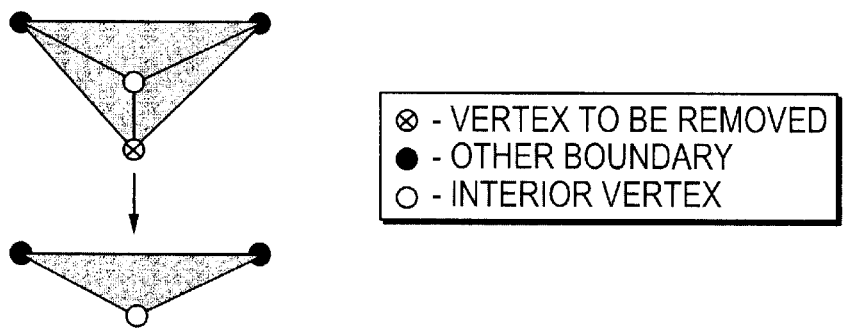

To best understand the rationale behind these two tests consider the vertex removal examples shown in FIG. 6, where the hollow sphere with a x represents the boundary vertex being removed, the solid spheres represent the remaining boundary vertices and the hollow spheres the interior vertices. The operations displayed in FIG. 6a and 6b are valid, because they satisfy both tests. The third operation depicted in FIG. 6c is invalid, because an interior vertex would become a boundary vertex.

An interesting side-effect of Condition 3 is that all boundary edges are guaranteed to be Delaunay edges: the boundary edges in the original triangulation are Delaunay edges by definition, and the removal of a boundary vertex is only admitted if its two neighboring boundary vertices are joined by a Delaunay edge in the new triangulation. This observation has an important implication: all approximations of the input data can be computed efficiently using an unconstrained Delaunay algorithm.

If a vertex $x_{i,j}$ is deemed removable its associated error is computed with any user-specified error norm $E_c(x_{i,j})$. The error norm is independent of the present invention, and therefore a user may specify the norm that best suits his or her application domain. Three exemplary error norms are:

A distance norm: the error associated with $x_{i,j}$ is proportional to the distance between $x_{i,j}$ and the surface obtained after the removal of $x_{i,j}$.

An area norm: the error is proportional to the change in the surface area caused by the removal of $x_{i,j}$.

A volume norm: the error is proportional to the change in the surface volume caused by the removal of $x_{i,j}$.

Depending on the particular application any of these norms might be better suited than the others.

Vertex Removal Operation 417

The vertex removal operation, the core component of the pre-compute operations 301, is responsible for the iterative simplification of the input surface defined in hF 305.

The vertex removal operation 417 accepts the error table 415, the surface boundary structure 411 and the triangulated mesh 407 as input and updates the triangulated mesh 407 and surface boundary structure 411.

The first vertex removal operation is performed on the convex hull triangulation 407 of the height field 305 or, if pre-filtered, the filtered grid 403 computed by the grid triangulation operations 405. The vertex removal operation 417 identifies the vertex $x_{i,j}$ that must be removed by extracting the vertex $x_{i,j}$ from the error table 415 and it is defined as the vertex with lowest associated error. The result of the operation is an approximation of the surface that contains one less vertex. The removed vertex $x_{i,j}$ is then added to the front of the importance array $v_i$ 309 and its error to the front of the error array $v_e$ 311.

The removal of the vertex $x_{i,j}$ has the consequence of introducing a hole in the surface, because all neighboring triangles of $x_{i,j}$ are also removed by the operation. Therefore, a local re-triangulation step is required to fill the hole. A new correct Delaunay triangulation for the entire surface can be obtained by computing the Delaunay triangles that cover the hole, an operation that is computed efficiently by a decremental Delaunay triangulation algorithm. The decremental Delaunay triangulation algorithm is described in O. Devillers. "On deletion in Delaunay triangulation." Technical Report RR-3451, Inria, Institut National de Recherche en Informatique et en Automatique, 1999.

FIG. 7 is a schematic illustrating the decremental Delaunay triangulation algorithm.

Figure 7A:
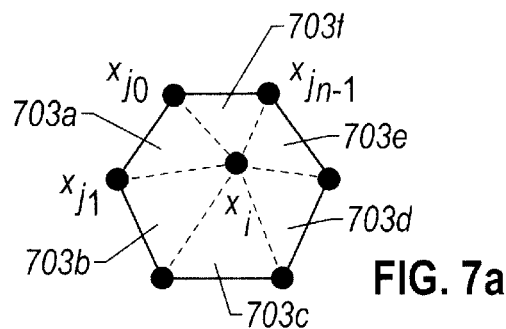
FIGS. 7a–7e are schematics illustrating the decremental Delaunay triangulation algorithm used by the height field decimator of FIG. 3.
Figure 7B:
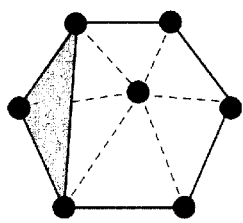
Figure 7C:
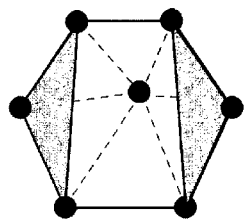
Figure 7D:
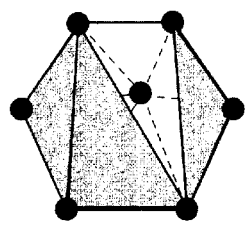
Figure 7E:
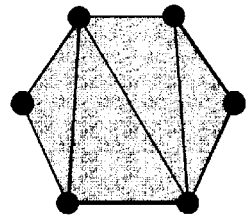

Consider the example displayed in FIG. 7a. The vertex $x_i$ has been removed from the surface; an operation that introduces the hole represented by the region around $x_i$ which includes the six triangles 703a–f. The decremental Delaunay triangulation technique exploits the parameter information of $x_i$ and of its neighboring vertices $x_{j_0}, \ldots, x_{j_{n-1}}$ to compute the set of Delaunay triangles that fill the hole. Given a parameter function $$P(x_l) = (P_{x,l}, P_{y,l}) \tag{7}$$

the decremental Delaunay triangulation operation is performed in two steps:

Step 1. Compute a weight for every neighboring vertex as $$\omega(j_k) = \begin{cases} \Omega(i, j_{k-1}, j_k, j_{k+1}) & \text{if } A(j_{k-1}, j_k, j_{k+1}) > 0 \\ \infty & \text{otherwise} \end{cases} \tag{8}$$

where $$A(j_{k-1}, j_k, j_{k+1}) = \left\| \begin{bmatrix} p_{x,j_{k-1}} & p_{x,j_k} & p_{x,j_{k+1}} \\ p_{y,j_{k-1}} & p_{y,j_k} & p_{y,j_{k+1}} \\ 1 & 1 & 1 \end{bmatrix} \right\| \tag{9}$$

and $$\Omega(i, j_{k-1}, j_k, j_{k+1}) = \frac{\left\| \begin{bmatrix} p_{x,j_{k-1}} & p_{x,j_k} & p_{x,j_{k+1}} & p_{x,i} \\ p_{y,j_{k-1}} & p_{y,j_k} & p_{y,j_{k+1}} & p_{y,i} \\ p_{x,j_{k-1}}^2 + p_{y,j_{k-1}}^2 & p_{x,j_k}^2 + p_{y,j_k}^2 & p_{x,j_{k+1}}^2 + p_{y,j_{k+1}}^2 & p_{x,i}^2 + p_{y,i}^2 \\ 1 & 1 & 1 & 1 \end{bmatrix} \right\|}{A(j_{k-1}, j_k, j_{k+1})} \quad \text{Equation (10)}$$

Step 2. The neighbor $x_{j_k}$ with the smallest weight $\omega(j_k)$ is selected and the triangle $$s = \{j_{k-1}, j_k, j_{k+1}\} \tag{11}$$

is built. This operation fills part of the hole close to $x_{j_k}$, and therefore the weight of its two neighbors $x_{j_{k-1}}$ and $x_{j_{k+1}}$ must to be computed by reapplying Step 1. This process is iterated, until the hole has been completely filled, as shown in FIGS. 7b through 7e.

After a vertex has been successfully removed from the surface, the error associated with its neighbors is updated again by the update error table operation 413 since their neighborhood information has changed. This iterative process continues, until the error associated with all remaining vertices is ∞. At that point, no vertex can be safely removed, as the operation would either introduce a self-intersection in parameter space or it would change the genus of the surface. Therefore, all remaining vertices are added to the vector $v_r$ and the pre-compute operation 301 is terminated.

The Run-time Operations 303

Figure 8:
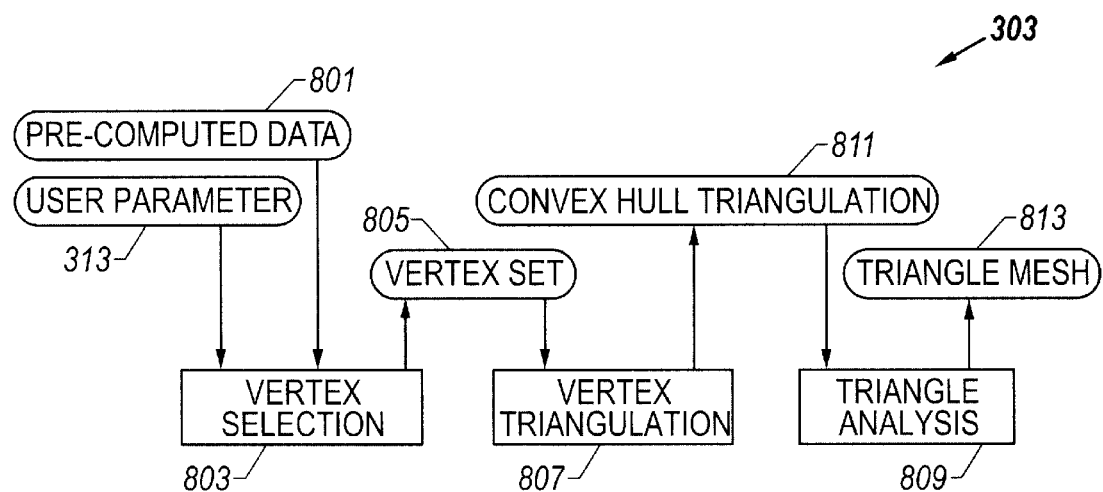
FIG. 8 is a data-flow diagram of the run-time operations of the height field decimator of FIG. 3.

The run-time operations 303 of FIG. 3 constructs approximations of the input surface 305 that satisfy a user-specified tolerance 313. The run-time operations 303 is illustrated in the data-flow diagram FIG. 8, where the oval-shaped objects represent the data that flows through the run-time operations 303 and the rectangles represent the operations performed on the data.

The following pseudo-code fragment presents a possible implementation of the run-time operations 303:

```
void D3b_Runtime(float userParameter) {
    // Step 1: Select the set of vertices
    vertices = selectVertices(userParameter);
    // Step 2: Compute the convex hull triangulation
    simplices = convexHullTriangulation(vertices);
    // Step 3: Remove any extra triangle
    for all triangles t in simplices do
        if (isExtraTriangle(t) == true)
            removeTriangle(t, simplices);
}
```

An approximation is constructed from a user-specified tolerance value in three main phases: a collection of vertices is selected that guarantees the construction of a valid approximation 803. Next, the vertices are triangulated 807, and all extra triangles present in the convex hull triangulation are finally removed from the mesh 809.

Vertex Selection and Convex Hull Triangulation 803

The construction of an approximation is initiated by the user, who specifies a quality parameter 313 that the approximation must satisfy. Usually, this parameter defines either the number of vertices that must be present in the approximation or the maximum error of the approximation.

The set of vertices that will be used to construct the approximation is extracted from the two vectors $v_r$ and $v_i$ built in the pre-compute operations 301. All vertices present in $v_r$ must be selected, since they are required to construct a topologically consistent approximation and are added to the vertex set 805. The quality parameter 313 specified by the user is then satisfied by adding the vertices from $v_j$, starting from the front of the vector $v_i$. These vertices are also added to the vertex set 805.

The convex hull triangulation 811 of the vertices in the vertex set 805 is computed using a full unconstrained Delaunay triangulation algorithm in vertex triangulation operation 807. The construction of a correct triangulation relies on an important assumption: the approximation built in the run-time operations 303 should be identical to the approximation of the surface computed in the pre-compute operations 301 that contained the same set of vertices, which may be guaranteed by applying the same triangulation algorithm in both the pre-compute operations 301 and in the run-time operations 303 and by utilizing the same parameter values for all vertices. In addition, no degenerate point configuration has to be present, i.e. a unique triangulation must exist for any collection of vertices. A method to resolve this problem is discussed in greater detail below in conjunction with FIGS. 10, 11 and 12.

Removal of Extra Triangles

The convex hull triangulation 811 constructed in the vertex triangulation step 807 has some interesting properties, the most important being that all boundary edges of the approximation are present as Delaunay edges. Therefore, the correct surface approximation is computed by eliminating all extra triangles that cover the holes present in the surface. This fact is an immediate consequence of the admissibility test introduced in the pre-compute operations 301.

The extra triangles are identified efficiently by making use of the boundary structure 411 built in the pre-compute operations 301. A triangle is removed from the convex hull triangulation 811 if it satisfies the following conditions:

Condition 4: The three vertices of the triangle lie on the same boundary of the surface.

Condition 5: The triangle is on the right-hand side of the boundary. This condition is verified efficiently by analyzing the boundary indices of the three vertices of the triangle. If starting from the vertex with largest index the indices are in decreasing order the triangle is on the right-hand side of the boundary, otherwise it is on the left-hand side. Note that if the boundary is closed special care must be taken when checking this condition.

Figure 9:
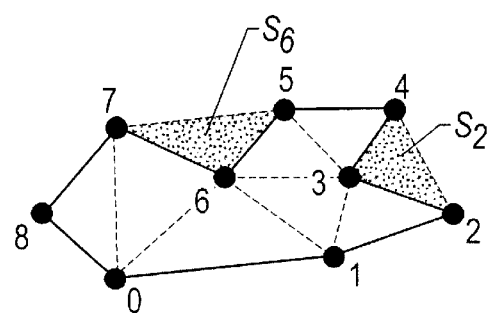
FIG. 9 is an illustration of the removal of extra triangles next to a boundary.

This process is illustrated in the example in FIG. 9. The approximation is defined by nine vertices, all of which lie on the boundary of the surface. The boundary index of the vertices is specified by an integer $i \in \{0, \ldots, 8\}$ and the convex hull triangulation is defined by the simplices $s_j, j \in \{1, \ldots, 9\}$. The application of the two conditions onto the nine simplices results in the removal of the two lightly shaded triangles $s_2$ and $s_6$.

The following table is a listing of valid and invalid triangles from the example of FIG. 9:

| Valid Triangles | | | Invalid Triangles |
|---|---|---|---|
| $s_1 = \{1,2,3\}$ | $s_7 = \{6,7,0\}$ | | $s_2 = \{4,3,2\}$ |
| $s_3 = \{3,4,5\}$ | $s_8 = \{7,8,0\}$ | | $s_6 = \{7,6,5\}$ |
| $s_4 = \{3,5,6\}$ | $s_9 = \{0,1,6\}$ | | |
| $s_5 = \{1,3,6\}$ | | | |

The triangle removal operation of the triangle analysis 809 is efficient because Conditions 4 and 5 are a direct consequence of the implementation of Conditions 1, 2 and 3 in the pre-compute operations 301 and of the assumption that the input surface 305 is one connected component.

Parameterization of the Height Field 305

The height field decimator 300 operates on the assumption that any subset of vertices of the input height field possesses a unique Delaunay triangulation. A preferred embodiment of the invention uses preferred vertex parameterization that satisfies this assumption.

The input data is assumed to be a grid of size $s_u \times s_v$, and without loss of generality, with the additional assumption that $s_u \geq s_v$. The definition of a height field grid provides the natural parameterization $P_1(x_{i,j})$ displayed in FIG. 10 in which $P_1(x_{i,j}) = p_{i,j} = (i,j)$. However, this parameterization does not yield a unique Delaunay triangulation. Consider, for example, any two rows and any two columns: their intersection defines four vertices for which two valid Delaunay triangulations exist. This condition is only one of many instances where a unique triangulation cannot be constructed.

Figure 11:
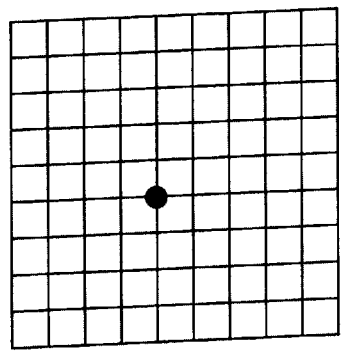
FIG. 11 is a perturbed grid.

The problem of degenerate point configurations, i.e., where there are four or more points on a common circle, is often solved by perturbing the parameter positions computed with $P_1(x_{i,j})$. This perturbed parameter function $P_2(x_{i,j})$ in which $$P_2(x_{i,j}) = p_{i,j} = (i,j) + R_{i,j}$$

$$R_{i,j} = (r_i \epsilon[0, \ldots, 1], r_j \epsilon[0, \ldots, 1]) \quad (12)$$

is illustrated in FIG. 11. The perturbed parameterization usually generates unique triangulations for any subset of vertices, but it possesses several limitations:

The uniqueness of the triangulation cannot be guaranteed since it depends on the choice of the noise function $R_{i,j}$ that is added to the parameter values.

The noise $R_{i,j}$ is often computed using a random number generator. This process is not deterministic, and thus the repeated triangulation of the same collection of points may generate different results. The problem is only prevented by storing the parameter values $p_{i,j}$ along with the height field data.

The construction of the noise vectors $R_{i,j}$ is a costly operation, and moreover requires the need to store the parameterization $p_{i,j}$ with the grid data.

Figure 12:
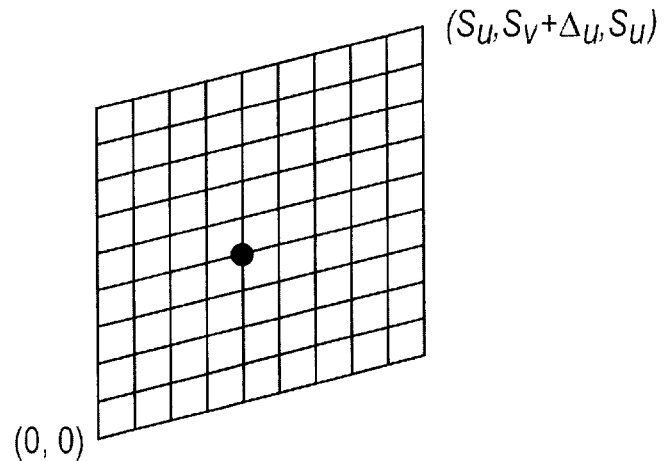
FIG. 12 is a skewed grid as used by a preferred embodiment of the invention.
Figure 13A:
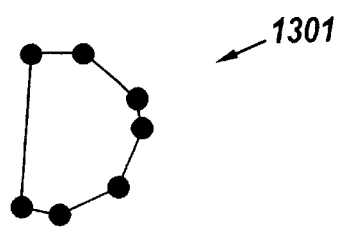
FIGS. 13a–13f are exemplary illustrations of the construction of a unique triangulation of a region in which the shortest edge is iteratively introduced until a complete triangulation of the region has been achieved.
Figure 13B:
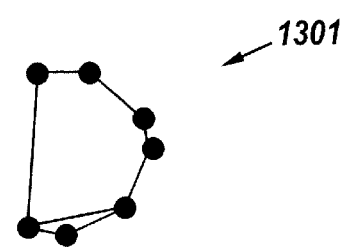
Figure 13C:
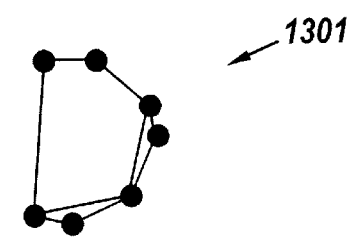
Figure 13D:
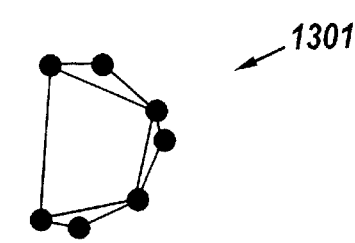
Figure 13E:
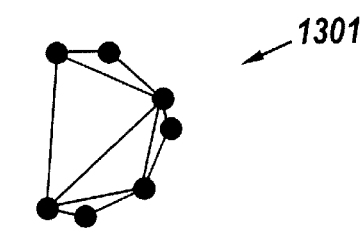
Figure 13F:
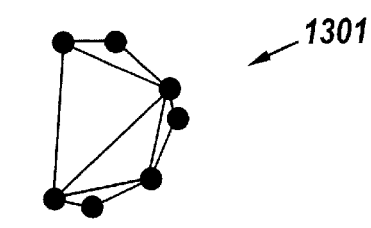

In a preferred embodiment, these problems are avoided by skewing the natural parameterization $P_1(x_{i,j})$ as shown in FIG. 12 in which $P_3(x_{i,j}) = p_{i,j} = (i, j+i\Delta_u)$ The parameter function $P_3(x_{i,j})$ can be utilized to generate unique triangulations by choosing the skewing constant $\Delta_u$ appropriately.

Formally, if the new parameterization satisfies the following two conditions, then a unique triangulation of an arbitrary subset of vertices can always be constructed.

Condition 1: The relative length of any two vectors must not be changed in the skewing process. This can be verified by ensuring that Equation 13 holds.

$$\|P_1(x_{i,j})\| < \|P_1(x_{k,l})\| \to \|P_3(x_{i,j})\| < \|P_3(x_{k,l})\| \quad (13)$$

Condition 2: The length of any two vectors in the skewed parameterization must differ, unless the two vectors are parallel. This can be verified by ensuring that Equation 13 and Equation 14 hold.

$$\|P_1(x_{i,j})\| = \|P_1(x_{k,l})\| \to \|P_3(x_{i,j})\| \neq \|P_3(x_{k,l})\| \quad (14)$$

These conditions must hold in the extended interval that contains all vectors defined between any two vertices in the grid, which is defined as $i,k \in [0, \ldots, s_u-1]$ $j,l \in [-(s_u-1), \ldots, s_u-1]$ Assume that a value for $\Delta_u$ exists such that both conditions are satisfied. Then given a set of vertices a unique triangulation is constructed as follows:

The function $P_3(x_{i,j})$ is utilized to evaluate the parameter position $p_{i,j}$ of all vertices $x_{i,j}$. Based on this information, the complete Delaunay triangulation of the set of vertices is computed.

All degenerate point configurations present in the resulting mesh are marked for post-processing. This operation could be performed efficiently by analyzing the dual of the Delaunay triangulation, the Voronoi diagram.

Every degenerate point configuration is then examined separately. By the definition of the Delaunay criterion, the lack of a unique triangulation implies that all vertices lie on a circle. Any edge connecting two of these vertices is a valid Delaunay edge, and the problem consists in choosing a unique collection of edges. This operation is performed using a divide-and-conquer strategy: of all admissible edges the shortest is selected, thus splitting the problem into two subproblems. The same process is then applied recursively on the two subregions, until a complete triangulation is computed. This process is depicted in FIG. 13 on a sample region.

FIG. 13 is an illustration of the construction of a unique triangulation. FIG. 13a is an illustration of a region 1301 with no triangulation. FIGS. 13b through 13e illustrate the introduction of the shortest edge and iterative triangulation of the region 1301. FIG. 13f illustrates the complete and unique triangulation of the region 1301.

The approach of skewing the parameterization as described above in conjunction with FIG. 12 and the iterative triangulation described in conjunction with FIG. 13 is guaranteed to generate a unique triangulation, because the length of the candidate Delaunay edges is guaranteed to be different. Parallel edges have the same length, but by definition they do not interfere with one another.

In one embodiment the skewing parameter $\Delta_u$ is set to $$\Delta_u = \frac{1}{4S_u^2}.$$

In another embodiment the skewing of the height field is given by the following parameterization:

$$P_4(x_{i,j})=(i \cdot s_u, j \cdot s_u + i)$$

Figure 14:
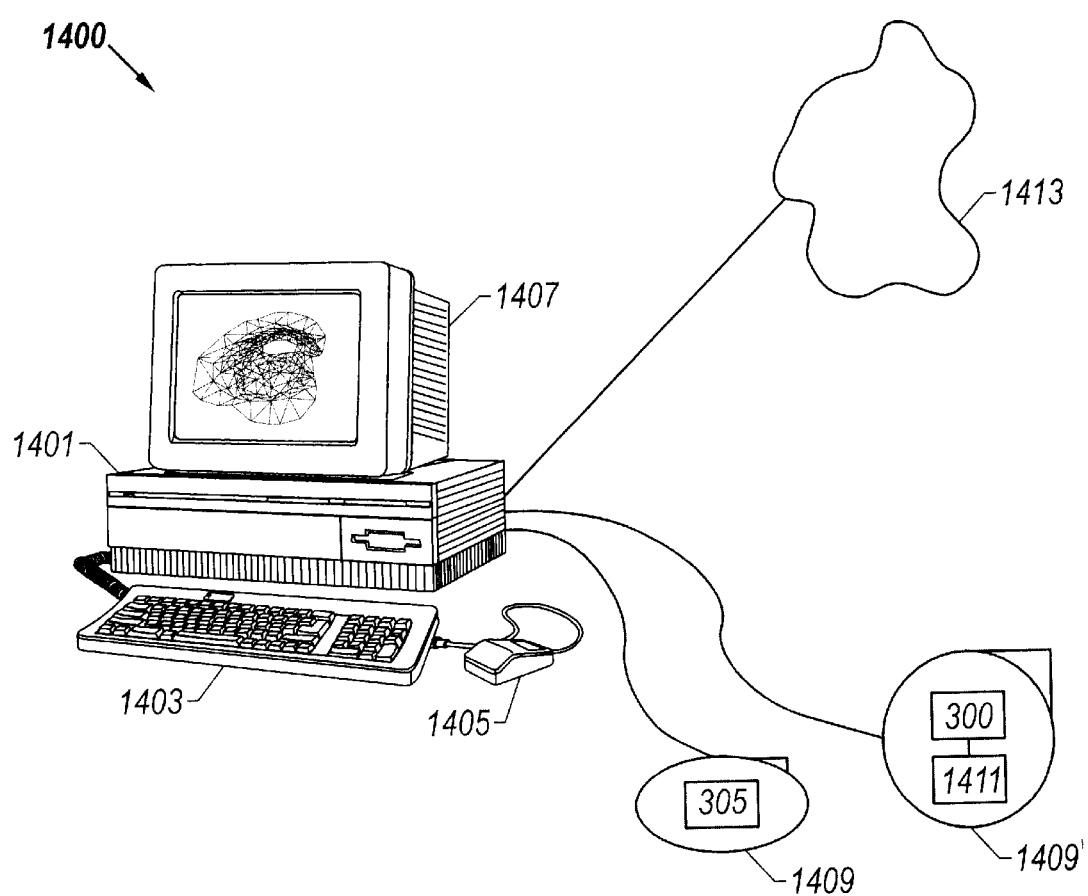
FIG. 14 is an illustration of a computer workstation for displaying graphical data.

FIG. 14 is an illustration of a computer workstation 1400 used for manipulating or visualizing graphical representations of data. The computer workstation 1400 consists of, for example, a central processing unit 1401 connected to several input devices, such as, keyboard 1403 and mouse 1405 and display device 1407. The workstation 1400 also includes or is connected to one or more disk drives or other secondary storage, for example as illustrated, disk drives 1409 and 1409'. The secondary storage, for example, disk drive 1409, may contain some data suitable for graphical representation. That data may be stored as a height field 305. A computer program 1411 for controlling the CPU 1401 to cause the display of data on display device 1407 may be stored on the secondary storage, e.g., 1409'. The computer program 1411 may include or be logically connected to a height field decimator 300, as described herein above, for simplifying the height field 305.

Furthermore, the workstation 1400 may be connected to a computer network 1413. The workstation may obtain both data and software, for example, the height field decimator 300, over the computer network 1413.

The invention has been described with a particular data flow for illustrative purposes. Modifications to that dataflow are also possible and are to be considered within the scope of the invention. The invention is not limited to any of the specific features described herein, but includes all variations thereof within the scope of the appended claims.

What is claimed is:

1. A method of simplifying a surface represented as a height field, having a two-dimensional grid of vertices and a corresponding height value at each vertex location wherein for certain vertices the height value is undefined, into a simplified triangular mesh, such that the topology of the surface is maintained in the simplified surface representation, comprising:

a. assigning error values to each vertex not having a missing value;

b. identifying as required vertices those vertices that may not be removed without altering the topology of the surface;

c. removing u-n vertices where where u is the number of vertices that do not have missing values in the original height field and n is greater than or equal to the number of required vertices and less than or equal to u.

2. The method of claim 1, further comprising:

d. assigning an importance value to each vertex, and wherein in step c the u-n vertices with lowest importance values are removed.

3. The method of claim 2, where the step (d) of assigning an importance value to each vertex comprises successively removing the vertex with the lowest error value, placing vertex with the lowest error value at the front of an importance vector and recomputing the error values for the remaining vertices until only the required vertices remain.

4. The method of claim 3, further comprising the step of retriangulating the remaining vertices using a decremental Delaunay triangulation.

5. The method of claim 1, wherein steps a and b are performed in a pre-compute operation wherein step c is performed in run-time operation in response to receiving a simplification request from a user and deriving the parameter n from that request.

6. The method of claim 1, further comprising:

e. triangulating the remaining n vertices.

7. The method of claim 6, wherein the triangulating step is a Delaunay triangulation.

8. The method of claim 6, further comprising the step of displaying the triangulation of the remaining n vertices on an output device.

9. The method of claim 1, further comprising:

skewing the height field.

10. The method of claim 9, wherein the skewing is accomplished using a fixed skewing factor $\Delta_u$ determined by:

$$\Delta_u = \frac{1}{4S_u^2},$$

where $S_u$ is the convex hull triangulation.

11. The method of claim 9, wherein the skewing is determined by $$(i,j) \to (i \cdot s_u, j \cdot s_u + i),$$

where $S_u$ is the convex hull triangulation.

12. The method of claim 1, where n is determined from a method selected from the set including accepting n as input from a user, and deriving n from user defined error criteria.

13. The method of claim 1, further comprising pre-filtering the height field data.

14. The method of claim 1, further comprising the step of displaying the triangular mesh having n vertices on a computer display device.

15. A set of computer executable instructions for directing a computer to simplify a surface represented as a height field, having a two-dimensional grid of vertices and a corresponding height value at each vertex location wherein for certain vertices the height value is undefined, into a simplified triangular mesh, such that the topology of the surface is maintained in the simplified surface representation, the set of computer executable instructions comprising:
   a. logic for assigning error values to each vertex not having a missing value;
   b. logic for identifying as required vertices those vertices that may not be removed without altering the topology of the surface; and
   c. logic for removing u-n vertices where where u is the number of vertices that do not have missing values in the original height field and n is greater than or equal to the number of required vertices and less than or equal to u.

16. The set of computer executable instructions of claim 15, further comprising:
   d. logic for assigning an importance value to each vertex, and wherein in step c the u-n vertices with lowest importance values are removed.

17. The set of computer executable instructions of claim 16, where the logic (d) for assigning an importance value to each vertex comprises logic for successively removing the vertex with the lowest error value, placing vertex with the lowest error value in at the front of an importance vector and recomputing the error values for the remaining vertices until only the required vertices remain.

18. The set of computer executable instructions of claim 15, wherein the logic a and b are executed in a pre-compute operation and wherein logic c is executed in run-time operation in response to receiving a simplification request from a user and deriving the parameter n from that request.

19. The set of computer executable instructions of claim 15, further comprising:
   e. logic for triangulating the remaining n vertices.

20. The set of computer executable instructions of claim 19, wherein the logic for triangulating is a Delaunay triangulator.

21. The set of computer executable instructions of claim 19, further comprising logic for displaying the triangulation of the remaining n vertices on an output device.

22. The set of computer executable instructions of claim 15, further comprising:
   logic for skewing the height field.

23. The set of computer executable instructions of claim 22, wherein skewing is accomplished by a fixed skewing factor $\Delta_u$ determined by:

$$\Delta_u = \frac{1}{4S_u^2},$$

where $S_u$ is the convex hull triangulation.

24. The set of computer executable instructions of claim 22, wherein the skewing is determined by $$(i,j) \rightarrow (i \cdot s_u, j \cdot s_u + i);$$

where $S_u$ is the convex hull triangulation.

25. A system for simplifying and displaying geometric height field representations of surfaces, comprising:
   a. a storage device for storing a computer program having instructions to direct a computer to simplify a height field representation of a surface, the instructions comprising pre-compute operations operable to instruct the computer to:
      i. assign error values to each vertex not having a missing value;
      ii. identify as required vertices those vertices that may not be removed without altering the topology of the surface; and
      iii. remove u-n vertices, where n is max(number of required vertices, number of vertices equivalent to a user specified resolution) and u is the number of vertices in an input height field;
   b. a computer having a central processing unit operable to execute operations in response to the computer program and for causing a simplified representation of the surface to be displayed on a display device.

26. A method of surface simplification wherein the surface is represented as a height field having vertices with a two-dimensional index and a corresponding value in a third dimension, the height field having areas of missing values wherein no value for the third dimension has been defined corresponding to the two-dimensional index with each such area of missing values, the method maintaining the missing values in simplified representations, comprising:
   a. a pre-compute procedure, comprising:
      i. trace boundaries around areas of missing values;
      ii. construct a triangulation of the vertices in areas other than the areas of missing values;
      iii. create an error table with an error value for each vertex such that vertices on boundaries have the highest possible error value;
      iv. remove the vertex having the smallest error value and remove the triangles neighboring that vertex thereby creating a hole;
      v. retriangulate the hole;
      vi. update the error values of vertices neighboring the removed vertex; and
      vii. repeat step a.iv) of removing vertices, step a.v) retriangulate the holes, and step a.vi) of updating error values until the smallest error value of the remaining vertices equals the highest possible error value;
   b. wherein the remaining vertices from step a.vii are required vertices; and
   c. a run-time procedure, comprising:
      i. obtain a request to simplify the surface to n vertices;
      ii. select all the vertices from the required vertices;
      iii. if n greater than the number of required vertices, select n-r additional vertices from the vertices removed in step a.iv where r is the number of required vertices;
      iv. remove all vertices except the selected vertices; and
      v. triangulating the selected vertices.

* * * * *